United States Patent
Kramer

(10) Patent No.: US 6,408,989 B2
(45) Date of Patent: *Jun. 25, 2002

(54) VEHICLE BRAKE SYSTEM HAVING A SENSOR TO MEASURE MOVEMENT

(75) Inventor: Dennis A. Kramer, Troy, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,315

(22) Filed: Jul. 31, 2001

Related U.S. Application Data

(63) Continuation of application No. 09/185,481, filed on Nov. 3, 1998, now Pat. No. 6,273,218.

(51) Int. Cl.[7] .............................................. F16D 66/00
(52) U.S. Cl. ............................. 188/1.11 R; 188/1.11 L; 188/324; 340/454
(58) Field of Search ...................... 188/1.11 R, 1.11 L, 188/1.11 E, 74, 78, 324, 329, 330, 332; 192/30 W; 340/454, 547, 549; 24/207.2, 207.26

(56) References Cited

U.S. PATENT DOCUMENTS

| | | |
|---|---|---|
| 3,776,329 A | 12/1973 | Hope et al. |
| 5,157,329 A | 10/1992 | Brauer |
| 5,253,735 A | 10/1993 | Larson et al. |
| 5,339,069 A | 8/1994 | Penner et al. |
| 5,825,287 A | 10/1998 | Zarybnicky, Sr. et al. |
| 6,273,218 B1 * | 8/2001 | Kramer .................. 188/1.11 R |

* cited by examiner

Primary Examiner—Pam Rodriguez
(74) Attorney, Agent, or Firm—Carlson, Gaskey & Olds

(57) ABSTRACT

A vehicle brake assembly includes a sensor that detects the amount of movement of certain components within the brake assembly. In the preferred embodiment, a rotary sensor is coupled directly with the generally S-shaped cam member and provides signals that indicate the total amount of rotary movement of the cam member during braking applications. These signals provide information indicative of the amount of slack or stroke during braking applications and provide indications of the conditions of brake linings associated with the brake shoes within the brake assembly. The sensor information preferably is communicated to a vehicle operator in a manner that indicates whether an inspection or maintenance of the braking system is advisable

18 Claims, 5 Drawing Sheets

VEHICLE BRAKE SYSTEM HAVING A SENSOR TO MEASURE MOVEMENT

CROSS REFERENCE TO RELATED APPLICATIONS

This application is a continuation of U.S. patent application Ser. No. 09/185,481, which was filed on Nov. 3, 1998 now U.S. Pat. No. 6,273,218.

BACKGROUND OF THE INVENTION

This invention generally relates to vehicle brake systems. More particularly, this invention is related to a vehicle brake system having a sensor that detects the amount of movement of components within the brake system.

A variety of vehicle braking systems are well known. In some configurations a generally S-shaped cam member serves as an actuator for a drum brake assembly. The cam member acts upon rollers that, in turn, cause movement of brake shoes during a braking application. It is necessary in such braking systems to determine when one or more of the components may need replacement or adjustment.

For example, brake shoe linings wear over time. It is important to monitor the amount of wear on the brake shoe linings to ensure that appropriate maintenance is done in a timely fashion. Additionally, it is useful to determine the total amount of stroke during a braking application. The amount of stroke is typically related to a gap between the brake shoe lining and the inner surface of the drum.

Prior to this invention there has not been a suitable device that has proven to be accurate, robust and economical enough to provide the desired information regarding the components of the brake system. This invention addresses that need and provides a unique arrangement for accurately and efficiently monitoring the operation condition of components within the vehicle brake assembly.

SUMMARY OF THE INVENTION

In general terms, this invention is a vehicle brake assembly that includes a sensor that detects the amount of movement of certain components within the brake assembly to indicate certain characteristics of the brake assembly components. A system designed according to this invention includes a drum and a pair of brake shoes each having a lining or engagement surface for selectively engaging an inner surface on the drum during a braking application. A cam member serves as an actuator during a braking application. Rollers preferably are interposed between the brake shoes and the cam member so that the cam member engages the rollers and causes the brake shoe linings to engage the inner surface of the drum during the braking application. A sensor is coupled with the cam member or the rollers and detects the amount of movement of the cam member or rollers during a braking application. The sensor provides a signal that indicates the amount of movement of the cam member or the rollers during a braking application and that information is used to measure characteristics of the components within the brake assembly.

The preferred embodiment includes a rotary sensor that is at least partially supported on the cam member. As the cam member rotates during a braking application, the sensor detects the amount of rotary movement. The amount of rotary movement provides an indication of several characteristics of the brake assembly including the amount of travel of the cam member and brake shoes during a braking application and the thickness of the linings on the brake shoes.

The various features and advantages of this invention will become apparent to those skilled in the art from the following detailed description of the preferred embodiments. The drawings that accompany the detailed description can be briefly described as follows.

DETAILED DESCRIPTION OF THE PREFERRED EMBODIMENTS

Figure 1:
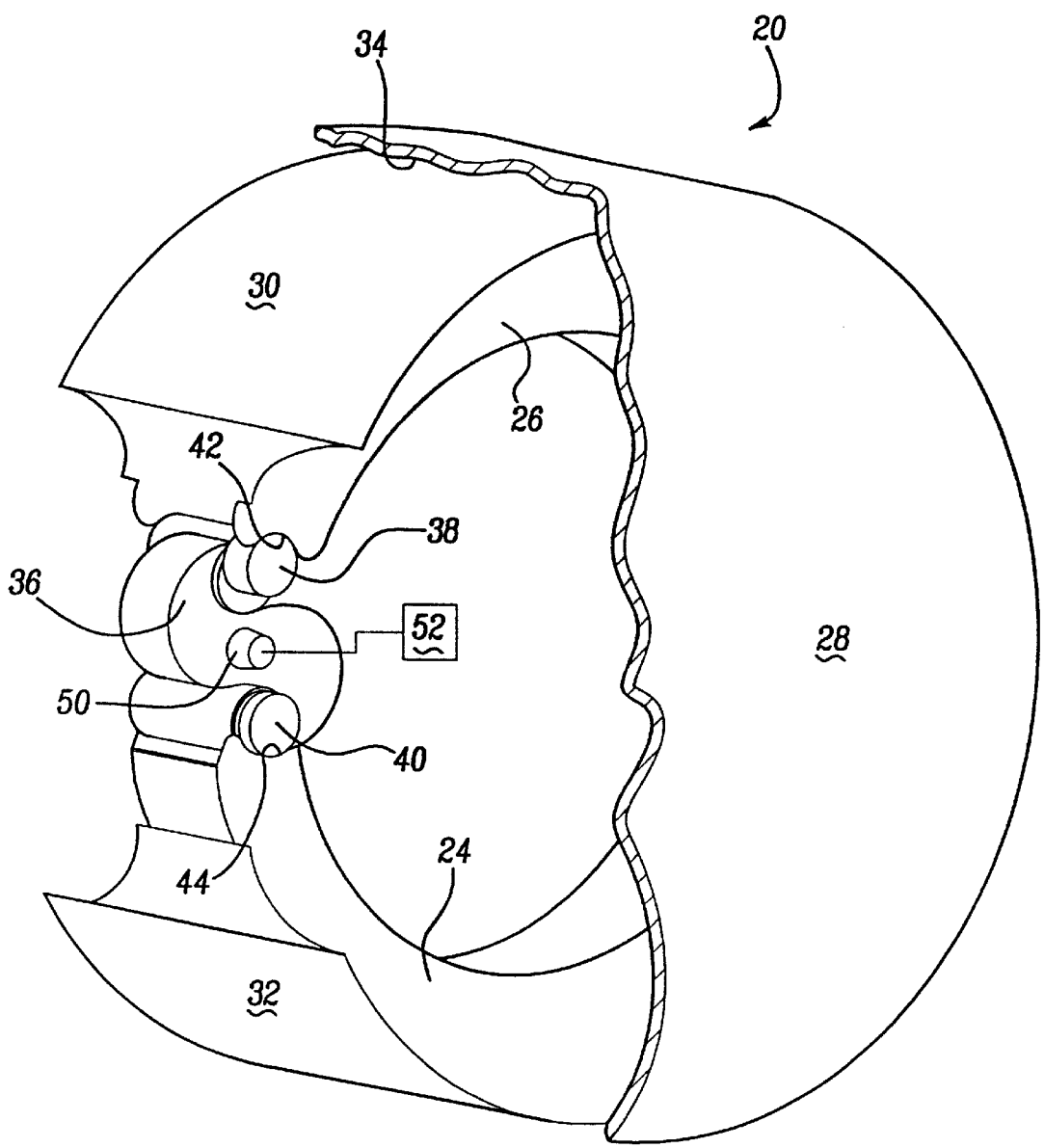
FIG. 1 is a diagrammatic illustration of a system designed according to this invention.

FIG. 1 diagrammatically illustrates a vehicle brake assembly 20. A set of brake shoes 24 and 26 are supported within a brake drum 28 in a conventional manner. Each of the brake shoes includes a lining 30 and 32, respectively, which provide an engagement surface for engaging an inner surface on the drum 28 during a braking application.

A generally S-shaped cam member 36 is rotated about a central axis during a braking application in a conventional manner. Surfaces on the cam member 36 interact with rollers 38 and 40 that are interposed between receiving portions 42 and 44, respectively, on the brake shoes. Proper rotary motion of the cam member 36 causes the brake shoes to move outward so that the linings 30 and 32 engage the inner surface 34 on the drum 28, which brings about a desired deceleration of the vehicle.

This invention includes providing a sensor 50 for detecting the amount of movement of the cam member 36 or the rollers 38 and 40 during braking applications. In the embodiment of FIG. 1, the sensor 50 detects the amount of rotary movement of the cam member 36 during braking applications. The sensor 50 preferably provides signals to processing electronics 52. The signals preferably are indicative of the amount of movement of the cam member 36 during braking applications. Given this description, those skilled in the art will be able to choose from among commercially available electronics or microprocessors or to custom design circuitry and/or software to realize the electronics 52 and the signal processing that results in the collection of the desired data.

Figure 2:
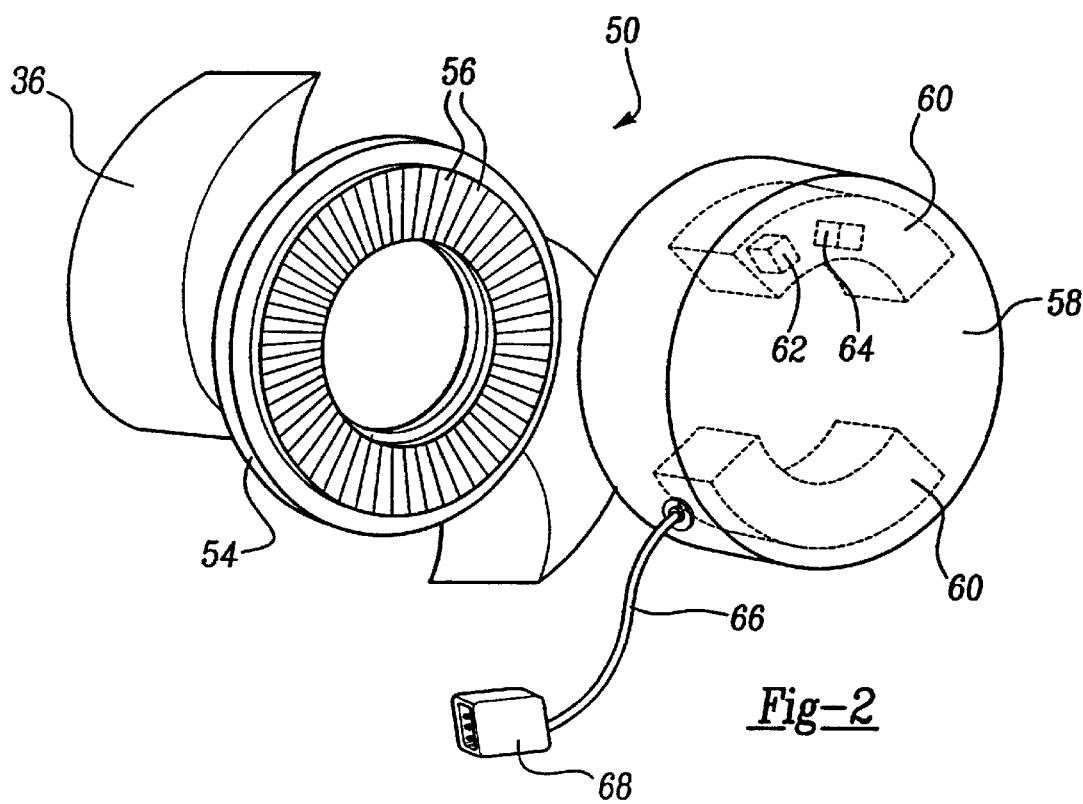
FIG. 2 is a diagrammatic illustration of selected components of the embodiment of FIG. 1.

FIG. 2 illustrates the sensor 50 in more detail. A generally annular disk portion 54 preferably is supported directly on the cam member 36 and rotates with the cam member. In this embodiment, the disk member 54 preferably includes a bias magnet. A plurality of segments 56 of a notched flux concentrator are supported on the disk member 54 and rotate with the cam member 36. A housing 58 supports a detector portion 60 that detects movement of the notched flux concentrator segments 56 during a braking application. In the illustrated embodiment, at least two hall effect sensors 62 and 64 are provided as part of the detector portion 60. The housing 58 can be conveniently mounted on the inside of the brake assembly. The housing 58 preferably is supported within the brake assembly so that it is near the cam member 36 and the detector portion can determine the amount of movement of the segments 56. The housing 58 preferably is supported relative to the disk member 54 so that the cam member and the segments 56 rotate relative to the housing and the detector portion 60 during braking applications.

A communication link 66 preferably is provided to transmit signals from the detector portions 60 to the electronics 52. The illustrated embodiment includes a three wire vehicle interface 68, which allows the sensor 50 to communicate with conventional vehicle electronics. It is possible to suitably modify existing vehicle electronics to handle and process the information gained by the sensor 50. Given this description, those skilled in the art will realize how to program existing vehicle electronics to provide the desired results.

Figure 3:
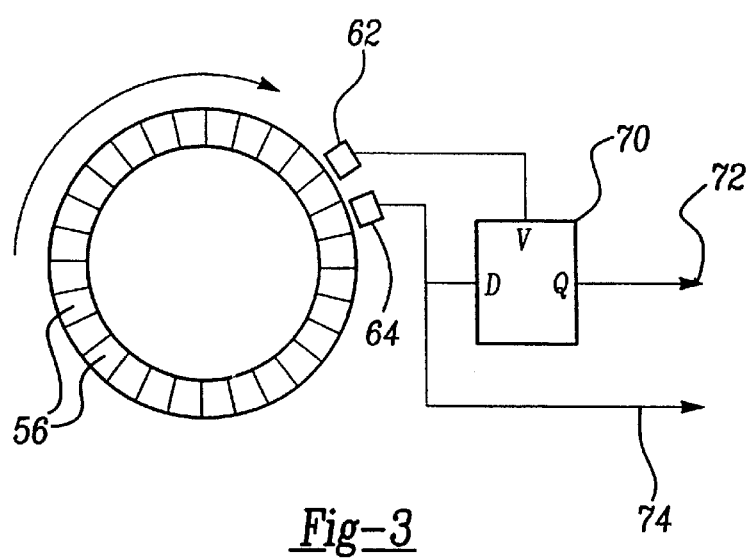
FIG. 3 schematically illustrates the operation of the embodiment of FIG. 2.

FIG. 3 schematically illustrates the preferred operation of the embodiment of FIG. 2. During a braking application, the cam 36 rotates to cause the rollers 38 and 40 and the brake shoes 24 and 26 to move outward so that the linings 30 and 32 engage the inner surface 34 on the drum 28. At the same time, the segments 56 rotate relative to the sensors 62 and 64. Signals from the sensors preferably are in pulse wave form. The signal of the sensor 62 preferably is 90° out of phase compared to the signal from the sensor 64. The signals from the sensors 62 and 64 preferably are fed into an integrated circuit chip 70, which preferably is a flip flop device. Since the signals from the sensors 62 and 64 are out of phase, the flip flop 70 provides a signal at the output 72 that is indicative of the direction of movement of the cam 36. In the embodiment of FIG. 3, the sensor 64 output also provides an indication of the amount of rotary movement of the cam member 36, which can be determined from the number of pulses on the output 74. The number of pulses preferably corresponds directly to the number of segments 56 that pass by each sensor 62 and 64 while the cam member 36 rotates.

An additional feature of this invention is the ability to determine and monitor the thickness of a lining on the brake shoes, which wear over time. An electronic controller preferably includes a memory module that tracks an initial position of the cam member during each braking application. As the brake shoe linings wear and become thinner, final position of the cam member typically changes. By monitoring changes in the final position of the cam member, which is also known as an engaged or end position, the electronic controller has an indication of the thickness of the brake shoe linings. Given this description, those skilled in the art will be able to program a commercially available electronic controller to perform this function.

Figure 4:
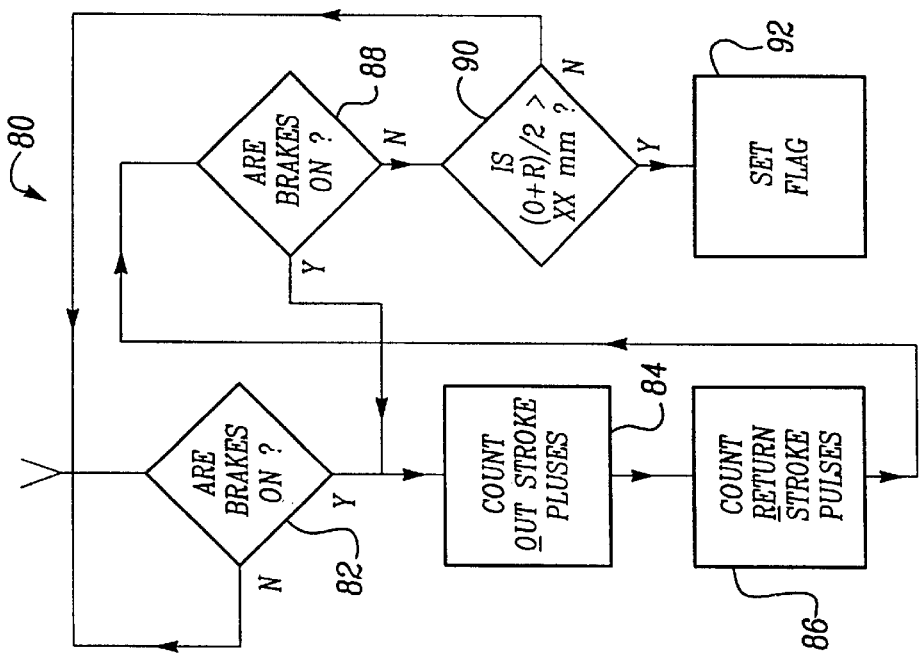
FIG. 4 is a flow chart diagram illustrating the preferred method of using the embodiment of FIG. 2.

FIG. 4 includes a flow chart 80 that illustrates the preferred method of using the information from the embodiment of FIGS. 2 and 3. The method begins by determining at 82 whether the vehicle brakes are on. When the brakes are on, the number of outward stroke pulses is counted at 84. This would be determined, for example, by recognizing how many counterclockwise pulses are provided at the output 72. Next, the number of return stroke pulses are counted at 86. After the number of stroke pulses in each direction are determined, a determination at 88 is made whether the brakes are still on. If they are, then the number of stroke pulses in each direction are counted again. If the brakes are no longer on, then a determination is made at 90. The total number of stroke pulses (i.e., in both directions) preferably is divided by two. The quotient is then compared to a preselected number that corresponds to a desired maximum travel of the brake shoes 24 and 26 during the braking application. If the signals from the detector portions 60 indicate that the application and return travel of the brake shoes during the braking application are greater than the preselected maximum, then a flag is set at 92. The flag can include, for example, a light on the instrument panel or dashboard of the vehicle that indicates to the vehicle operator that the brake linings may need inspection or maintenance.

When the detector portions 60 indicate that the amount of travel of the linings within the brake assembly during a braking application is greater than the preset number, that indicates a condition where excessive brake stroke is necessary to achieve a desired braking condition. Therefore, this invention provides an effective and efficient way of monitoring the amount of slack during a brake stroke and providing information to the vehicle operator that assists the operator in obtaining any necessary maintenance on the brake system.

At the same time, the embodiment of FIGS. 2 and 3 provides an indication of the total amount of angular movement of the cam member 36 during the braking application. The total number of counterclockwise pulses, for example, indicates the degree of rotation of the cam member 36 during the braking application. Given this description, those skilled in the art will realize that a variety of determinations can be made by utilizing a sensor designed according to this invention, which would be useful in maintaining the vehicle brake assembly.

Figure 5:
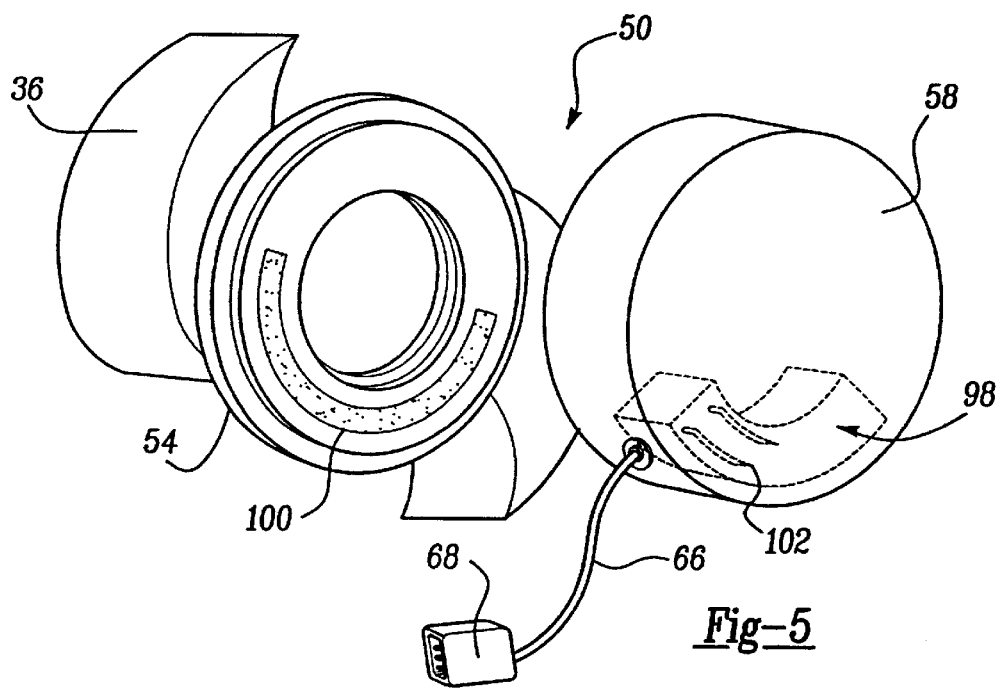
FIG. 5 is a diagrammatic illustration of an alternative embodiment of the sensor illustrated in FIG. 1.

FIG. 5 illustrates an alternative embodiment of the sensor 50. Instead of providing digital pulse signals, the embodiment of FIG. 5 provides an analog signal. In this embodiment, the disk-shaped member 54 preferably comprises a magnetic attachment base. A variable resistor assembly 98 preferably is used to provide an analog signal indicating movement of the cam member 36 during braking applications. A linear resistance trace 100 and a dual contact assembly 102 function as the variable resistor. In this example, Cermet Film Technology preferably is used to make the variable resistor 98.

Figure 6:
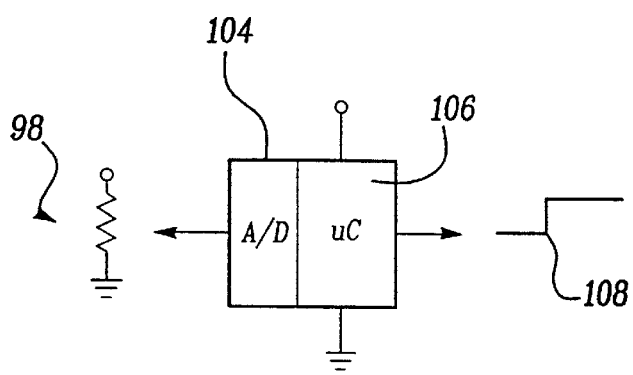
FIG. 6 schematically illustrates the operation of the embodiment of FIG. 5.

FIG. 6 schematically illustrates the operation of the embodiment of FIG. 5. As the cam member 36 rotates, the linear resistance trace 100 moves relative to the dual contact assembly 102. This provides an analog signal from the variable resistor 98. The analog signal is then converted by an analog-to-digital converter 104 and fed through an integrated circuit chip 106. The output signal 108 from the chip 106 preferably provides an indication of the angular position of the cam member at the beginning of the braking application and at the end of the braking application. The changes in the signal from the variable resistor 98 provide the indication of the beginning and end of the movement of the cam member 36.

In this embodiment, the variable resistor preferably provides an absolute resistance value that is indicative of the beginning position of the cam member during each braking application. As mentioned above, the final position of the cam member is useful to determine the thickness of the brake shoe linings.

Figure 7:
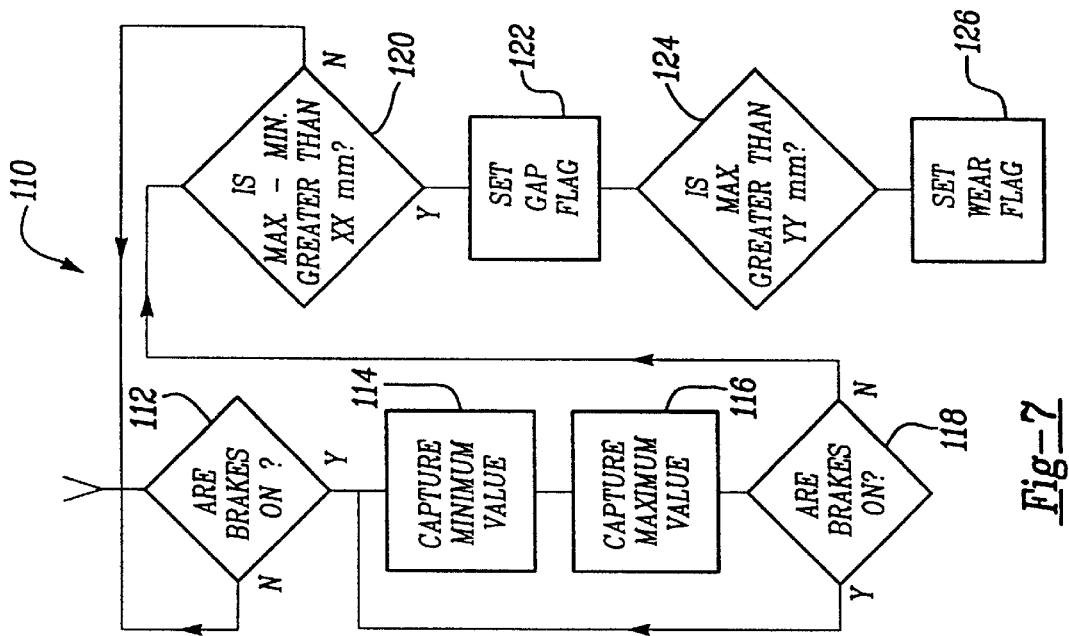
FIG. 7 is a flow chart diagram illustrating the preferred method of using the embodiment of FIG. 5.

FIG. 7 includes a flow chart 110 that illustrates the preferred method of using the embodiment of FIGS. 5 and 6. First a determination is made at 112 whether the brakes are on. When the brakes are on, the minimum value from the variable resistor 98 is determined at 114 to provide an indication of the initial position of the cam member 36. The maximum value from the variable resistor 98 is determined at 116 to provide an indication of the final position of the cam member 36 as it rotates about its axis during the braking application. Once the maximum value from the variable resistor 98 is determined, a decision is made whether the brakes are still on at 118. If the brakes are no longer on then a comparison is made at 120 between a preselected value and the difference between the maximum and minimum values provided by the variable resistor 98. If the difference between the maximum signal (which, in this example, indicates the final position of the cam member) and the minimum signal (which, in this example, indicates the initial position of the cam member) is greater than the preselected value, then a flag is set at 122.

In this particular instance, the flag indicates that there is a gap between the linings 32 and 34 and the inner surface of the drum 34 that exceeds a preselected value. The flag can be an indicator on the instrument panel or dashboard of the vehicle, for example, which alerts the vehicle operator to the need to inspect and/or service the linings 30 and 32 or the brake system generally. Additionally, the maximum displacement of the cam member is compared to a preselected value at 124. If this value exceeds the preselected maximum then another flag preferably is set at 126. This flag indicates a condition of the linings 30 and 32 indicative of an excessive amount of wear such that it may be desirable to replace the linings or the shoes in the brake assembly.

Figure 8:
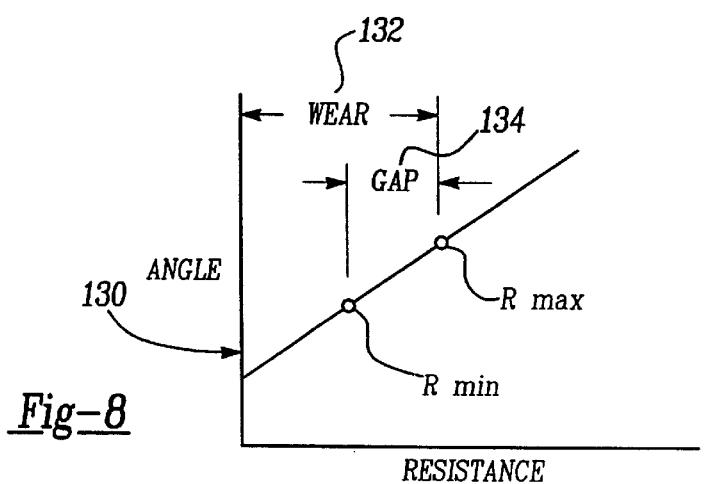
FIG. 8 is a graphic illustration of information obtained using the embodiment of FIG. 5.

FIG. 8 diagrammatically illustrates the relationships between the maximum resistance value and the minimum resistance value provided by the variable resistor 98. The plot 130 shows a graph of resistance verses the angle of displacement of the cam member 36. The magnitude of the maximum value of the signal from the variable resistor 98 shown at 132 provides an indication of the amount of wear on the brake shoe linings 30 and 32. The difference between the maximum and the minimum values indicated at 134 provides an indication of the stroke required to complete the braking application.

The just-described embodiment includes a variable resistor and utilizes maximum and minimum values of signals provided by that resistor. Given this description, those skilled in the art will realize that other digital or analog devices such as potentiometers will provide signals that can be manipulated by suitable electronics to make the same determinations made as described above. This invention is not to be limited to a specific digital or analog arrangement just because specific examples have been given.

Figure 9:
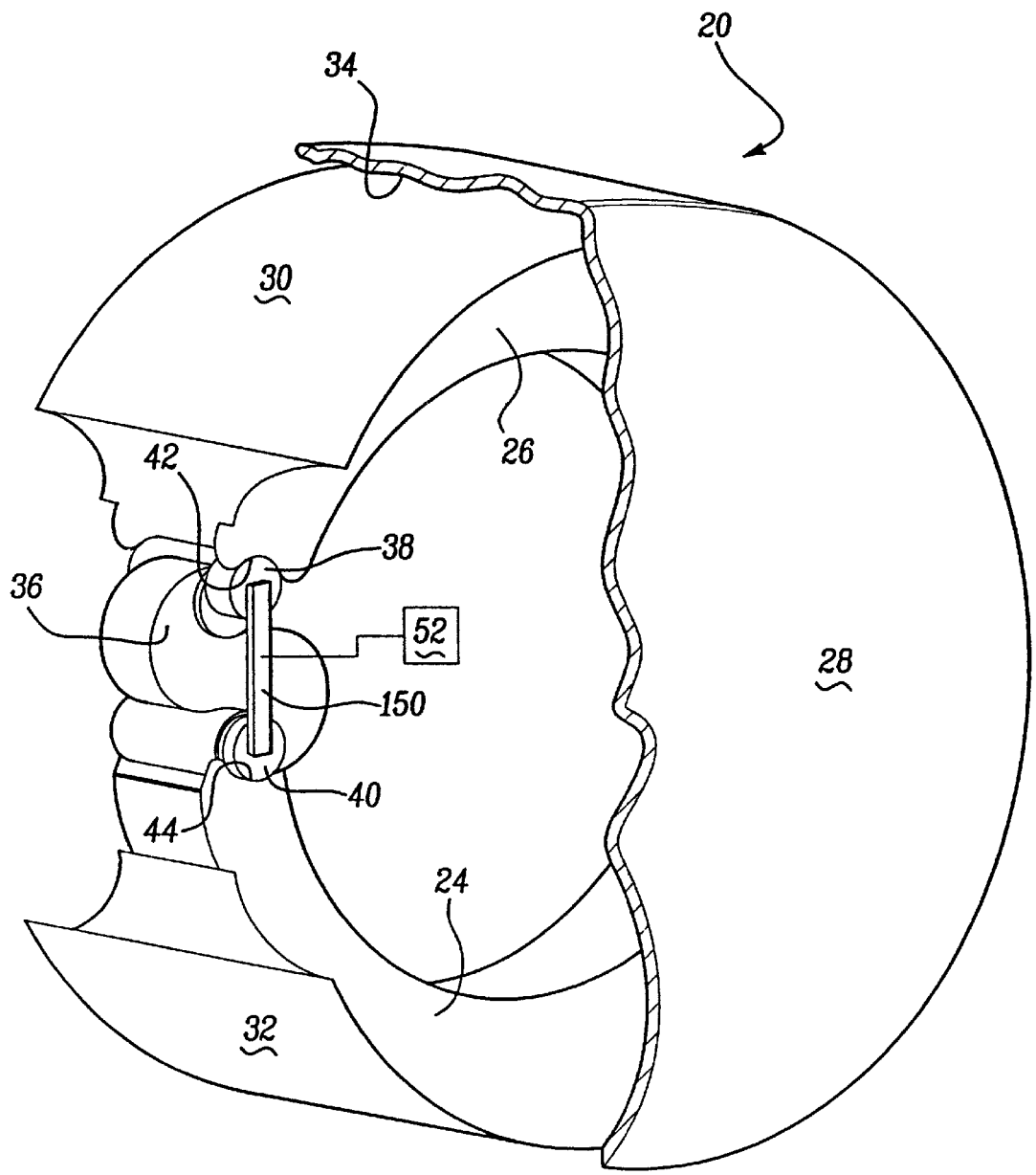
FIG. 9 is a diagrammatic illustration of an alternative embodiment of this invention.

FIG. 9 illustrates an alternative embodiment of a system 20 designed according to this invention. The sensor 150 preferably is a sensor that is coupled with the rollers 38 and 40 and detects the amount of generally linear displacement of the rollers during a braking applications. Signals from the sensor 150 provide an indication to the electronics 52 of the amount of movement of the rollers during the braking application. This information can be used (similar to the information obtained from the rotary sensor 50 as described above) to determine the amount of stroke and the condition of the brake shoe linings similar to the manner described above. The sensor 150 can include a variable resistor or potentiometer, for example. Given this description, those skilled in the art will be able to choose from among commercially available components to realize the sensor 150 and will be able to develop the necessary software for processing the signals to provide the desired information.

It should be noted that the embodiment of FIG. 1 is preferred over the embodiment of FIG. 9. It has become apparent that the rotary form of a sensor 50 provides superior resolution to that which measures the generally linear displacement of the rollers during a braking application as illustrated in FIG. 9. In either embodiment, the sensor is conveniently and strategically supported within the brake assembly and interacts directly with the moving components of the braking assembly to provide the desired information.

The description just given provides details regarding the currently preferred embodiments of this invention. Variations and modifications may become apparent to those skilled in the art that do not depart from the purview and spirit of this invention. The legal scope of protection given to this invention can be determined only by studying the following claims.

What is claimed is:

1. A vehicle brake system, comprising:
    a drum;
    a brake shoe having an engagement surface for selectively engaging an inner surface on the drum;
    a cam member supported for selective rotary movement;
    a roller interposed between the brake shoe and the cam member and engaging the cam member and moving responsive to rotary movement of the cam member; and
    a sensor that detects an amount of movement of said cam member or said roller during a braking application and provides a signal responsive to any amount of movement of the cam member, the signal having a signal characteristic that changes responsive to the cam movement such that the signal is indicative of the amount of movement.

2. The system of claim 1, further comprising a signal processor that processes the sensor signal and determines if the brake system components are in a condition that requires repair or inspection based upon the sensor signal characteristic and provides a signal to a vehicle operator of the condition.

3. The system of claim 1, wherein said sensor is coupled to said cam member and said sensor comprises a rotary member that rotates with the cam member and a detector that detects the rotary movement of the rotary member and generates the sensor signal based upon the amount of detected rotary movement.

4. The system of claim 3, wherein the rotary member is mounted directly on the cam member and the detector is supported in a housing that is supported within the brake system such that the rotary member moves relative to the detector.

5. The system of claim 3, wherein said rotary member includes a plurality of magnetic segments arranged in a generally circular pattern and wherein said detector generates a pulse signal upon detecting movement of one of the segments past the detector as the cam member rotates and the signal characteristic comprises a number of pulses.

6. The system of claim 5, wherein the detector includes a first detector portion that generates a first signal indicating the amount of rotary movement and a second detector portion that generates a second signal indicating the amount of rotary movement and wherein a combination of the first and second signals indicate a direction of the rotary movement.

7. The system of claim 1, wherein the sensor comprises a rotary variable resistor.

8. The system of claim 1, wherein said sensor is coupled to said roller and wherein said roller moves in a generally linear pattern responsive to rotary movement of the cam member and wherein the sensor includes a moving member that moves with the roller and a detector that detects the movement of the moving member and generates the sensor signal based upon the amount of detected movement.

9. The system of claim 1, wherein the sensor generates a signal indicative of a final position of the brake shoe during a braking application and wherein the system further comprises an electronic controller that determines a thickness of a lining on the engagement surface of the brake shoe based upon the final position signal.

10. The system of claim 1, wherein the signal characteristic comprises a number of pulses.

11. The system of claim 1, wherein the signal characteristic comprises a change in the signal, the change indicating a beginning and an end of movement of the cam member.

12. A method of determining an amount of movement of brake shoes within a vehicle brake assembly having a drum, a brake shoe, a cam that rotates and a roller interposed between the cam and the brake shoe such that rotary movement of the cam causes the brake shoe to engage an inner surface on the drum, comprising the steps of:

(A) sensing an amount of rotary movement of the cam during a braking application;

(B) continuously generating a signal responsive to any rotary movement of the cam, the signal having a characteristic that changes responsive to the rotary movement of the cam such that the signal is indicative of the amount of sensed movement; and (C) determining an amount of movement of the brake shoe between a beginning position and an engaging position where the brake shoe engages the inner surface on the drum based upon the amount of movement indicated in step (B).

13. The method of claim 12, further comprising determining when the amount of movement from step (C) exceeds a preselected amount and generating an indicator signal for an operator of the vehicle indicative of the condition of the brake assembly components.

14. The method of claim 12, further comprising determining the engaging position of the cam member during a braking application and monitoring changes in the engaging position over a series of braking applications and determining a thickness of a lining on the brake shoe based upon the determined engaging position.

15. The method of claim 12, including determining a first amount of movement of the cam in a first direction from a beginning position to an end position where the brake shoe engages the inner drum surface;

determining a second amount of movement of the cam in a second direction from the end position to a rest position at the end of the braking application; and determining an amount of braking stroke by determining an average of the first and second amounts of movement.

16. The method of claim 15, including determining when the amount of braking stroke is greater than a preselected amount and providing an indication to a vehicle operator that the preselected amount has been exceeded.

17. The method of claim 12, including generating a number of pulses indicative of the amount of sensed movement.

18. The method of claim 12, including varying a signal value from a first value indicating a beginning of a braking application to a second value indicating an end of the amount of sensed movement.

* * * * *